US007038134B2

(12) United States Patent
Daugherty et al.

(10) Patent No.: US 7,038,134 B2
(45) Date of Patent: May 2, 2006

(54) COAXIAL CABLE TERMINATION SYSTEM

(75) Inventors: James D. Daugherty, Brookfield, OH (US); Frederick Donald Esenwein, Canfield, OH (US); Joseph Howard Gladd, Cortland, OH (US); William C Ketterer, Girard, OH (US); Andrew Michael Spisak, Youngstown, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/771,760

(22) Filed: Feb. 4, 2004

(65) Prior Publication Data

US 2005/0167145 A1 Aug. 4, 2005

(51) Int. Cl.
*H02G 15/08* (2006.01)

(52) U.S. Cl. .................................................... 174/75 C

(58) Field of Classification Search .............. 174/75 C, 174/78, 74 R

See application file for complete search history.

(56) References Cited

U.S. PATENT DOCUMENTS 2,901,528 A * 5/1959 Lazar ....................... 174/75 C
4,060,887 A * 12/1977 De Groef .................... 29/828

FOREIGN PATENT DOCUMENTS

EP 1 246 300 10/2002
WO 95/17024 6/1995

OTHER PUBLICATIONS

European Search Report dated Apr. 13, 2005.

* cited by examiner

*Primary Examiner*—Chau N. Nguyen
(74) *Attorney, Agent, or Firm*—David P. Wood

(57) ABSTRACT

A coaxial cable termination system for providing a reliable electrical connection of an end of a coaxial cable to an electrical device. An electrically conductive core body is cast over the core of the coaxial cable, and an electrically conductive shield body is cast over the shield of the coaxial cable, wherein the core and shield bodies are electrically and mechanically connected to the coaxial cable, yet the core and shield bodies mutually have direct current electrical isolation with respect to each other. Each of the core and shield bodies has respective attachment features for a particular application, such as for example connecting to a circuit board.

17 Claims, 4 Drawing Sheets

COAXIAL CABLE TERMINATION SYSTEM

TECHNICAL FIELD

The present invention relates to termination structures used to connect a coaxial cable to a circuit board

BACKGROUND OF THE INVENTION

Coaxial cables have an inner electrical conductor, referred to herein simply as a "core," an outer electrical conductor, referred to herein simply as a "shield" which is concentrically disposed around the core, an inner dielectric disposed between the core and the shield, and a protective outer covering, referred to simply herein as the "jacket." Coaxial cables are used widely in the electrical arts, for example to send radio frequency (RF) from one electrical component to another. The shield provides the dual function of guiding the RF energy within the coaxial cable without allowing its escape to the outside, while preventing external RF energy from entering.

By way of exemplification of a coaxial cable, the core and shield together form a conduit for the transmission of RF energy which travels through the dielectric, not the core (that is, the inner conductor). The principal purpose of the shield is to guide the traveling wave. Because RF current flows only on the surfaces of conductors, the shield (that is, the outer conductor) can provide the secondary function of shielding, because internal and external currents can exist simultaneously and separately on opposite surfaces. The shield is usually connected to a chassis or to earth ground, but need not be. The jacket is often made of plastic, which is also dielectric, but it can be any material, including metal, wherein its function is mechanical and has no relation to its dielectric properties.

Frequently, it is desirable to connect one end of a coaxial cable to a circuit board, also referred to commonly as a printed circuit board. In this regard, the circuit board includes a substrate, a plurality of electrical devices interfaced with the substrate through holes (vias) in the substrate, and conductive pathways on the substrate for providing electrical connections with respect to the interfaced devices.

A crimp terminal has been used in the prior art for connecting one end of a coaxial cable to a circuit board. As shown at FIG. 1, the inner dielectric 10, the shield 12 and the jacket 14 are removed from an end section 16*a* of a coaxial cable 16 to provide a naked core section 18*a* of the core 18. This naked core section 18*a*, which may be solder coated, is then used to solder to a connection location of the circuit board. A second end section 16*b* of the coaxial cable has the jacket and shield removed, thereby providing a naked inner dielectric section 10*a* of the inner dielectric 10. A third end section (not visible) of the coaxial cable has the jacket removed, thereby providing a naked shield section 12*a* of the shield 12. A crimp terminal 20 is then crimped onto the naked shield section 12*a*, and may be soldered thereto and further may be crimped by wings 22 to the adjacent intact jacket 14. The crimp terminal 20 has shield connection features 24, such as a plurality of blades (as shown) or a plurality of protruding wires, for being electrically connected to appropriate locations of the circuit board.

Several drawbacks of using a crimp terminal for connecting a coaxial cable end to a circuit board, include: portions of the crimp terminal protruding in relation to the circuit board, creating radiated interference issues and RF coupling to the board's opposite side; core location on the circuit board is not reproducibly precise nor robust, thereby introducing impedance variation and risking connection failure; making the electrical connections to the wire section and shield connection features is difficult; and, crimping of the shield can have inconsistent RF performance with regard to the individual crimps of a number of made crimps.

Accordingly, what remains needed in the art is a termination of an end of a coaxial cable which can effect a reliable connection to a circuit board without any of the drawbacks of the prior art.

SUMMARY OF THE INVENTION

The present invention is a coaxial cable termination system which provides a reliable connection of an end of a coaxial cable to an electrical device, such as for example a circuit board without any of the drawbacks of the prior art.

The coaxial cable termination system according to the present invention includes a core body electrically connected to the core of a coaxial cable and a shield body electrically connected to the shield of the coaxial cable, wherein the core and shield bodies are mechanically connected to the coaxial cable, yet the core and shield bodies mutually have direct current electrical isolation with respect to each other. Each of the core and shield bodies has respective attachment features for a particular application, such as for example connecting to a circuit board. Preferably, the core and shield bodies are die cast in a single operation.

In a preferred implementation of the present invention, an end portion of a coaxial cable is prepared such that an end section of the core of a coaxial cable is exposed, an adjoining portion of the inner dielectric of the coaxial cable is exposed, and a portion of the shield adjoining the exposed inner dielectric is exposed. A die is also prepared. The die is placed over the end portion of the coaxial cable, and metal is cast thereinto. The die is then removed, revealing a cast-formed core body electrically and mechanically connected to the core, and a cast-formed shield body electrically and mechanically connected to the shield, wherein the core and shield bodies are mutually separated a short distance therebetween at the exposed inner dielectric.

The coaxial cable termination system according to the present invention may be used to connect an end of a coaxial cable to a circuit board, wherein the die casting provides a reliable strain-free interface with the printed circuit board, and wherein the interface so provided is simply provided, with high reproducibility and with superior performance, as compared to that known in the prior art.

Accordingly, the coaxial cable termination system according to the present invention provides a core body and a shield body respectively for each of the core and shield of a coaxial cable, wherein the core and shield bodies serve as mutually separate electrical interfaces for connecting an end of the coaxial cable to an electrical component, such as a circuit board.

This and additional objects, features and advantages of the present invention will become clearer from the following specification of a preferred embodiment.

DESCRIPTION OF THE PREFERRED EMBODIMENT

Figure 1:
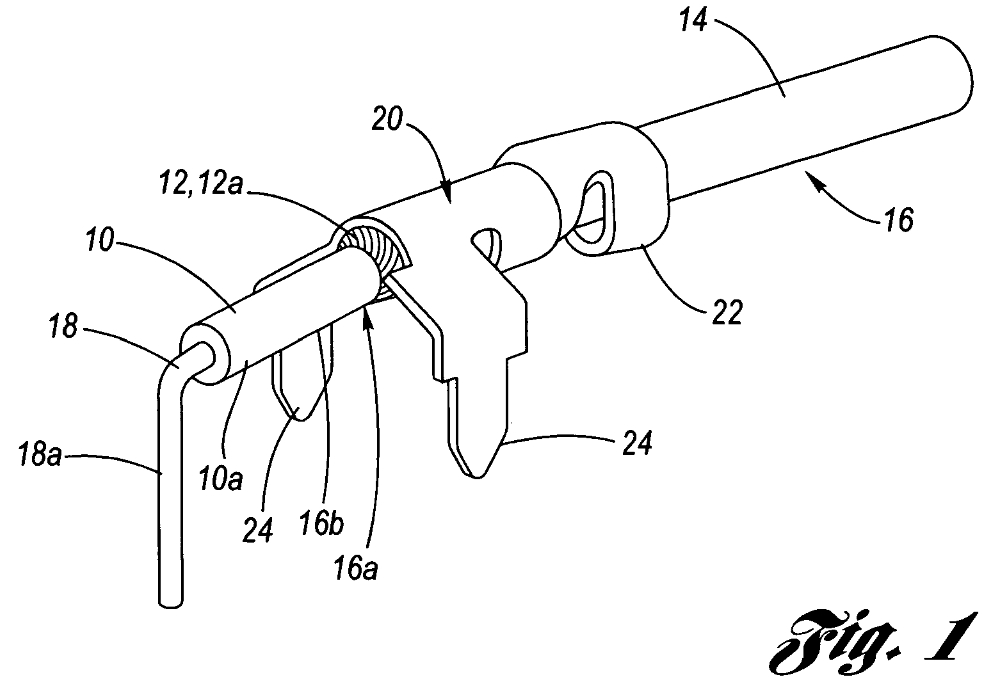
Fig. 1 Prior Art
FIG. 1 is a perspective view of a prior art crimp terminal connected to an end of a coaxial cable.

Referring now to the Drawing, FIGS. 2 through 6C depict various views of the coaxial cable termination system 100 according to the present invention, wherein the coaxial cable termination system is interfaced with a coaxial cable 102 having a conventional construction, as recounted hereinabove, of an electrically conductive core 104, an inner dielectric 106, an electrically conductive shield 108 and a jacket 110.

The coaxial cable termination system 100 includes a core body 112 electrically and mechanically connected with the core (inner conductor) 104 of a coaxial cable 102 (shown best at FIG. 5), and further includes a shield body 114 electrically and mechanically connected to the shield (outer conductor) 108 of the coaxial cable. Each of the core and shield bodies 112, 114 has respective attachment features 116, 118*a*, 118*b* which are configured as may be appropriate for a particular application, such as for example connecting to respective electrical connection pads 120, 122*a*, 122*b* on a circuit board 124, as shown at FIG. 2.

Figure 2:
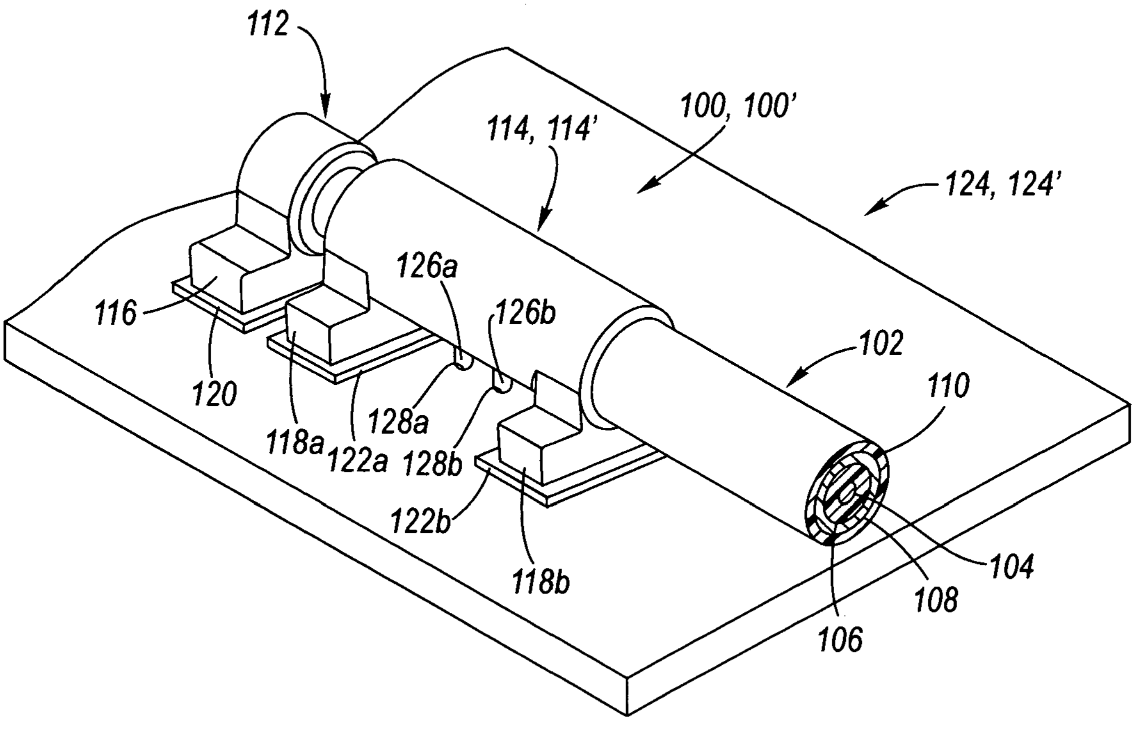
FIG. 2 is a perspective view of the coaxial cable termination system according to the present invention, shown in operation with respect to an end of a coaxial cable and a circuit board.
Figure 3:
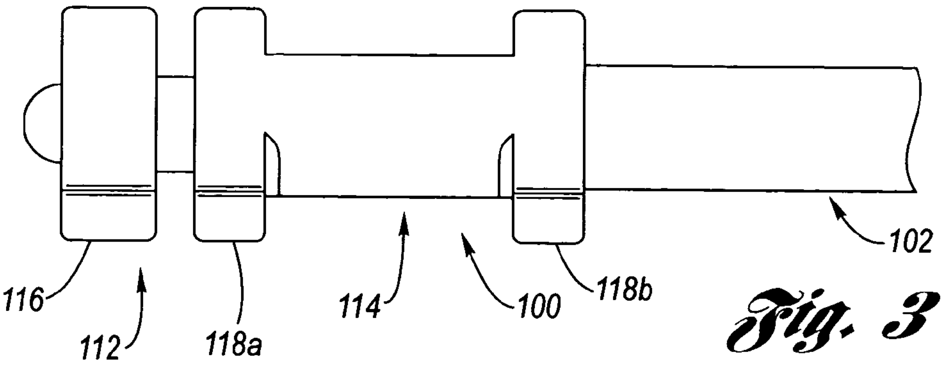
FIG. 3 is a side plan view of the coaxial cable termination system according to the present invention, shown in operation with respect to an end of a coaxial cable.
Figure 4:
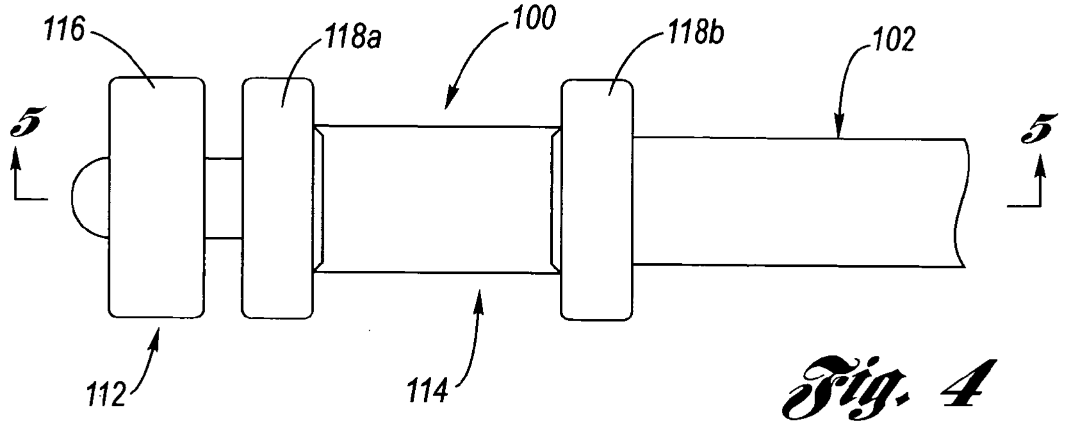
FIG. 4 is a bottom plan view of the coaxial cable termination system according to the present invention, shown in operation with respect to an end of a coaxial cable.
Figure 5:
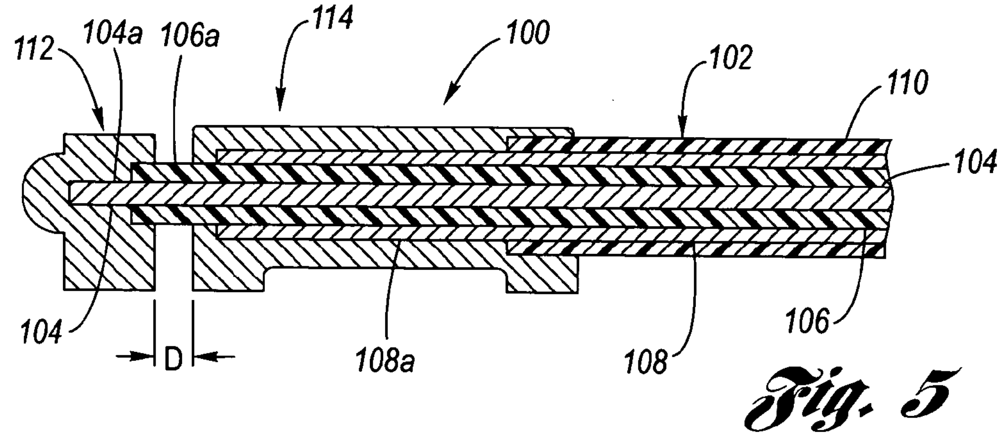
FIG. 5 is a sectional side view, seen along line 5—5 of FIG. 4.

As can be further discerned by FIG. 2, an alternative coaxial cable connection system 100' is also shown, wherein the shield body 114' has a pair of guide pins 126*a*, 126*b* depending therefrom which insert into complementing guide holes 128*a*, 128*b* formed in an alternative circuit board 124' to thereby provide location of the coaxial cable termination system relative to the circuit board prior to making the connections of the attachment features with respect to the connection pads. However, it is preferred to omit the guide pins unless in a particular application their inclusion is desirable, as it is necessary to ensure they do not contribute to RF emissions, as for example by ensuring they do not penetrate entirely through the circuit board.

Figure 6A:
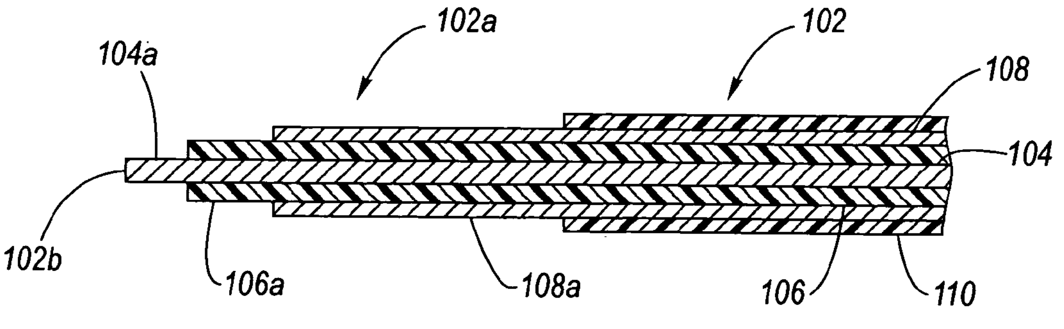
FIG. 6A depicts a first step of a method of implementation of the present invention.
Figure 6B:
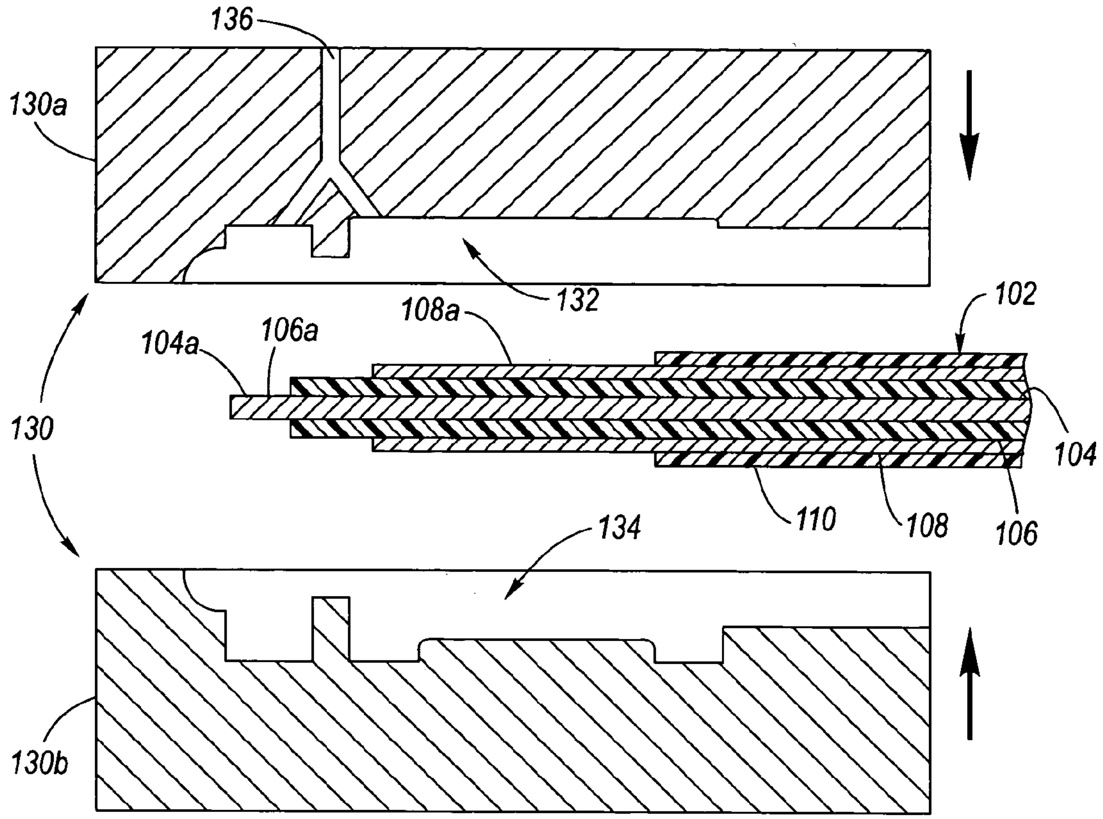
FIG. 6B depicts a second step of the method of implementation of the present invention.
Figure 6C:
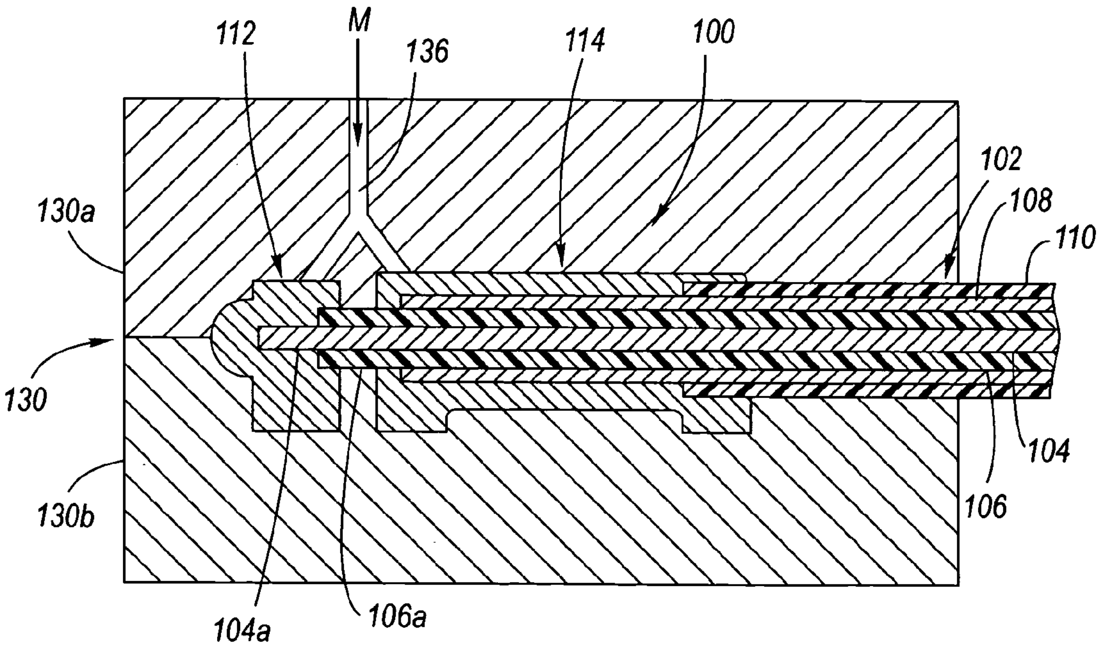
FIG. 6C depicts a third step of the method of implementation of the present invention.

It is preferred to implement the coaxial cable termination system 100 by casting the core and shield bodies 112, 114 in a single operation, as schematically shown at FIGS. 6A through 6C.

As shown at FIG. 6A, a prepared end section 102*a* of a coaxial cable 102 is provided as follows. The jacket 110, shield 108 and inner dielectric 106 are removed to provide an exposed core section 104*a* of the core 104 at the end 102*b* of the coaxial cable. The jacket 110 and shield 108 are removed to provide an exposed inner dielectric section 106*a* of the inner dielectric 106, wherein the exposed inner dielectric section adjoins the exposed core section. Finally, the jacket 110 is removed to provide an exposed shield section 108*a* of the shield 108, wherein the exposed shield section adjoins the exposed inner dielectric section remote from the exposed core section.

As shown at FIG. 6B, a die 130 is also prepared, having a first die half 130*a* having a first cavity 132 and a complementing second die half 130*b* having a second cavity 134 complementing the first cavity, wherein one of the die halves 130*a*, 130*b* has a sprue 136.

As shown at FIG. 6C, the die halves 130*a*, 130*b* are brought together with the prepared end section 102*a* of the coaxial cable 102 disposed therebetween such that the first and second cavities 132, 134 are mutually sealed in relation to the prepared end section. Next, castable, molten electrically conductive material, preferably a castable molten metal M, is castingly delivered to the first and second cavities 132, 134 through the sprue 136. After a cooling time suitable for the cast metal to solidify, the die halves 130*a*, 130*b* are separated, revealing a cast-formed core body 112 electrically and mechanically connected to the core 104, and a cast-formed shield body 114 electrically and mechanically connected to the shield 108. It will be noted that the casting process provides the following features (see also FIG. 5): firstly, the exposed core section 104*a* is entirely inside the core body 112, and the core body encompasses a portion of the exposed inner dielectric section 106*a;* secondly, the core and shield bodies 112, 114 are mutually separated a short distance D at the exposed inner dielectric section 106*a*, whereby the core and shield bodies mutually have direct current electrical isolation with respect to each other, yet the coaxial cable substantially rigidly orients the core body and the shield body in mutually parallel relation to the core locally thereat; and thirdly, the shield body encompasses, at one end thereof, a portion of the exposed inner dielectric section 106*a*, and, at its other end, a portion of the jacket 110.

The electrically conductive and castable metal M for the core and shield bodies 112, 114 is preferably a metal which casts without melting either of the inner dielectric 106 and the jacket 110 of the coaxial cable 102, and further provides a good solderability to electrical components. With regard to potential for melting or otherwise heat deforming the inner dielectric and jacket during the casting process, the amount of cast metal is relatively so small and the injection process so rapid, that the dwell time of the molten metal is short enough that the plastics of the coaxial cable are not untowardly affected.

A preferred casting metal meeting these criteria is a tin-antimony alloy, preferably 98 percent by weight tin and 2 percent by weight antimony, which has a melt temperature of about 450 degrees Fahrenheit. In this regard, while zinc (having a melt temperature of about 720 degrees Fahrenheit) could be used, it does not solder well, and although a tin-lead alloy could be used, this is, itself, solder and its melt temperature (of about 360 degrees Fahrenheit) is likely too low for soldering core and shield bodies formed thereof to electrical components in a mass production environment.

Returning to the operational example of FIG. 2, while it is preferred to solderingly connect each of the attachment features 116, 118*a*, 118*b* to the respective electrical connection locations 120, 122*a*, 122*b* on the circuit board 124, other suitable modalities for connection may be used, as for example by sonic welding, by laser welding or by an electrically conductive adhesive.

It is seen from the above exposition, the die casting process provides precisely defined core and shield bodies, each of which having excellent electrical and mechanical connection to the coaxial cable, while yet providing electrical D.C. isolation therebetween. Further, the attachment features provide for a mass production suitable, strain-free interface with electrical components, as for example the connection pads 120, 122*a* and/or 122*b* of a printed circuit board 124 (of FIG. 2), and wherein the interface so provided is simply provided, with high reproducibility and with superior performance, as compared to that known in the prior art.

Figure 7:
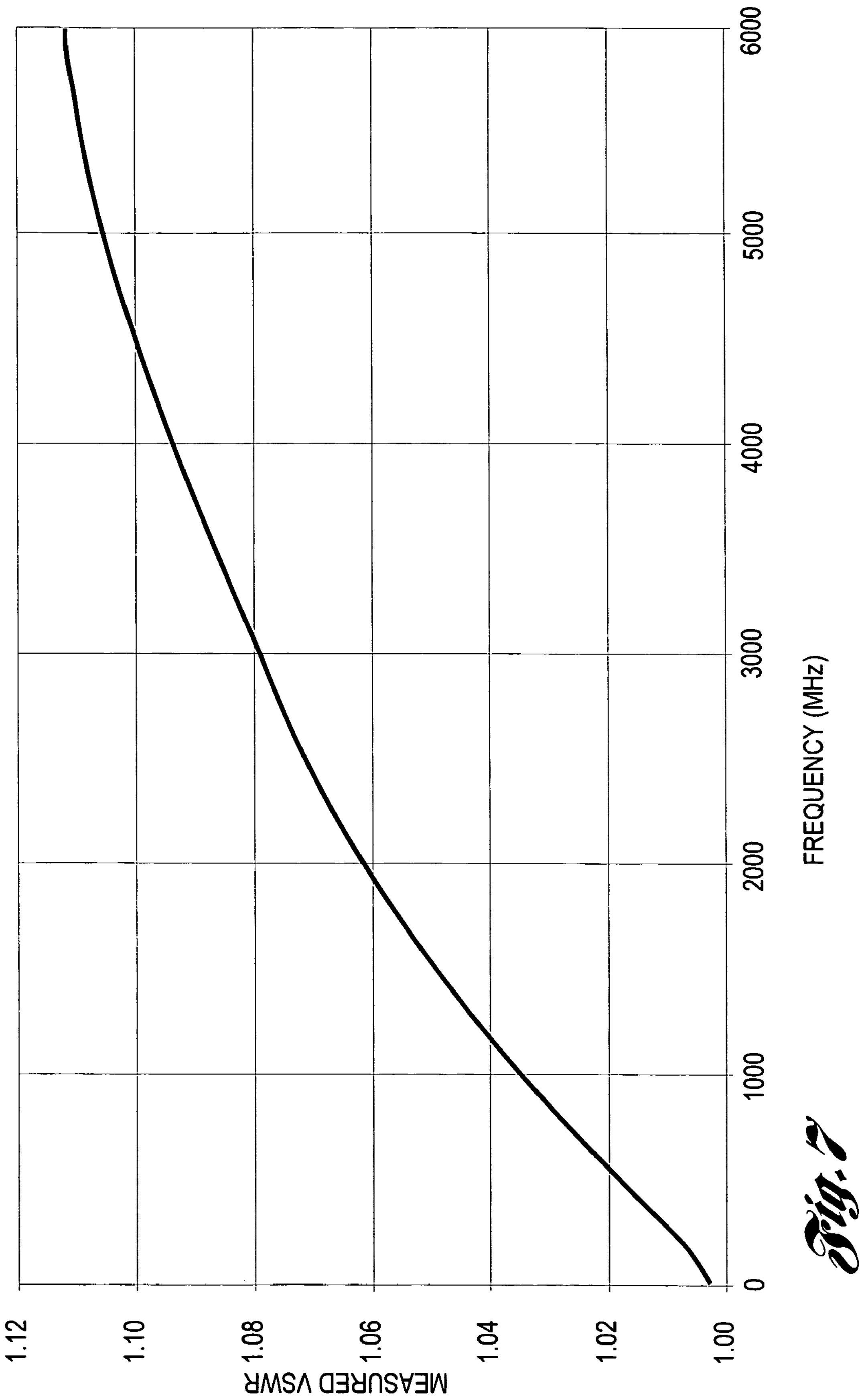
FIG. 7 is a graph showing voltage standing wave ratio as a function of frequency for the coaxial cable termination system according to the present invention.

Turning attention now to FIG. 7, the advantages of the coaxial cable termination system 100 can be seen. Plot 140 depicts frequency of a signal conducted through a coaxial cable versus voltage standing wave ratio (VSWR) of a coaxial cable termination system 100 interfaced with the coaxial cable, wherein the casting metal used was a tin-antimony alloy of 98 percent by weight tin and 2 percent by weight antimony. To facilitate attaching test samples to the test equipment, two coaxial cable termination systems were connected in series and tested together, wherein plot 140 represents a mathematical extraction of the VSWR for a single coaxial cable termination system from measured data for the two coaxial cable termination systems.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A coaxial cable termination system comprising:

a coaxial cable having an electrically conductive core, an inner dielectric concentrically surrounding said core, and an electrically conductive shield concentrically surrounding said inner dielectric;

wherein said core has an exposed core section, said shield has an exposed shield section, and said coaxial cable further has an exposed inner dielectric section extending between said exposed core section and said exposed shield section;

said coaxial cable termination system further comprising:

an electrically conductive core body formed over said exposed core section and electrically connected thereto, and an electrically conductive shield body formed over said exposed shield section and electrically connected thereto;

wherein said core body and said shield body mutually have direct current electrical isolation with respect to each other;

said exposed core section being disposed entirely inside said core body, wherein said core body encompasses a portion of said exposed inner dielectric section; and the shield body encompassing a portion of said exposed inner dielectric section;

wherein said coaxial cable substantially rigidly orients said core body and said shield body in substantially mutually parallel relation to said core locally thereat.

2. The coaxial cable termination of claim 1, further comprising:

a first electrical connection feature formed on said core body; and a second electrical connection feature formed on said shield body;

wherein said first and second electrical connection features provide mutually electrically exclusive connection interfaces to respective electrical connection locations of at least one electrical component.

3. The coaxial cable termination system of claim 1, further comprising a pair of guide pins depending from said shield body.

4. The coaxial cable termination system of claim 1, wherein said core and shield bodies comprise an electrically conductive and castable metal.

5. The coaxial cable termination system of claim 1, wherein said care and shield bodies comprise an electrically conductive and castable metal selected from the group consisting of a tin-antimony alloy, a tin-lead alloy, and zinc.

6. The coaxial cable termination of claim 1, wherein said core and shield bodies are mutually separated a short distance at said exposed inner dielectric section.

7. The coaxial cable termination of claim 1, wherein said core body is cast over said exposed core section.

8. The coaxial cable termination of claim 1, wherein said shield body is cast over said exposed shield section.

9. The coaxial cable termination system of claim 1, wherein said core body comprises an electrically conductive and castable metal.

10. The coaxial cable termination system of claim 1, wherein said shield body comprises an electrically conductive and castable metal.

11. The coaxial cable termination system of claim 1, wherein said core body comprises an electrically conductive and castable metal selected from the group consisting of a tin-antimony alloy, a tin-lead alloy, and zinc.

12. The coaxial cable termination system of claim 1, wherein said shield body comprises an electrically conductive and castable metal selected from the group consisting of a tin-antimony alloy, a tin-lead alloy, and zinc.

13. A coaxial cable termination system comprising:

a coaxial cable having an electrically conductive core, an inner dielectric concentrically surrounding said core, an electrically conductive shield concentrically surrounding said inner dielectric, and a jacket concentrically surrounding said shield, wherein said core has an exposed core section, said shield has an exposed shield section, and wherein said inner dielectric has an exposed inner dielectric section extending between said exposed core section and said exposed shield section;

a core body castingly formed over said exposed core section and electrically connected thereto, said core body encompassing a portion of said exposed inner dielectric section, said exposed core section being disposed entirely inside said core body; and a shield body castingly formed over said exposed shield section and electrically connected thereto, said shield body encompassing a portion of said exposed inner dielectric section and a portion of said jacket;

wherein said core and shield bodies are mutually separated a short distance at said exposed inner dielectric section, wherein said core and shield bodies mutually have direct current electrical isolation with respect to each other, and wherein said coaxial cable substantially rigidly orients said core body and said shield body in substantially mutually parallel relation to said core locally thereat.

14. The coaxial cable termination system of claim 13, further comprising:

a first electrical connection feature formed on said care body, and a second electrical connection feature formed on said shield body;

wherein said first and second electrical connection features provide mutually electrically exclusive connection interfaces to respective electrical connection locations of at least one electrical component.

15. The coaxial cable termination system of claim 13, wherein said core and shield bodies comprise an electrically conductive and castable metal.

16. The coaxial cable termination system of claim 13, further comprising a pair of guide pins depending from said shield body.

17. The coaxial cable termination system of claim 13, wherein said core and shield bodies comprise a comprise an electrically conductive and castable metal selected from the group consisting of a tin-antimony alloy, a tin-lead alloy, and zinc.

* * * * *